United States Patent [19]
Berkovsky et al.

[11] 3,748,530
[45] July 24, 1973

[54] DEVICE FOR ELECTRIC HEATING OF THE ANODES IN HIGH-VOLTAGE MERCURY-ARC RECTIFIERS

[76] Inventors: Alexandr Mikhailovich Berkovsky, Nizhne-Krasnoselskaya ulitsa, 45, kv. 244; Veniamin Efimovich Turetsky, Nizhne-Krasnoselskaya ulitsa, 45, kv. 90; Vladimir Petrovich Kulakov, 5 Parkovaya ulitsa, 39, korpus 1, kv. 46; Leonid Alexandrovich Vakhrameev, Staro-Kashirskoe shosse, 4, korpus 1, kv. 17, all of Moscow, U.S.S.R.

[22] Filed: Nov. 2, 1971

[21] Appl. No.: 194,971

[52] U.S. Cl. ............... 315/114, 315/146, 321/27 R, 321/32
[51] Int. Cl. .................... H01j 13/18, H01j 61/52
[58] Field of Search ................... 315/35, 36, 46, 50, 315/112–115, 146; 321/8 R, 27 R, 32

[56] References Cited
UNITED STATES PATENTS
2,155,251  4/1939  Bedford .......................... 315/146 X
2,820,189  1/1958  Uhlmann .......................... 321/27 R Primary Examiner—Roy Lake
Assistant Examiner—Siegfried H. Grimm
Attorney—Eric H. Waters, John G. Schwartz et al.

[57] ABSTRACT

Device for electric heating of the anodes in high-voltage mercury-arc rectifiers, used in bridge converters of d.c. substations each bridge arm contains series-connected rectifiers, each having an anode reactor, an individual isolating auxiliary-power transformer and a built-in electric anode heater; the latter draws its power from the individual isolating transformer of an adjacent rectifier in the same phase, the cathode of which is at the same potential as the anode being heated, and said reactor has an additional isolated winding which connects said heaters to one of the wires of the individual isolating transformers while the other wire is one of the power buses.

1 Claim, 1 Drawing Figure

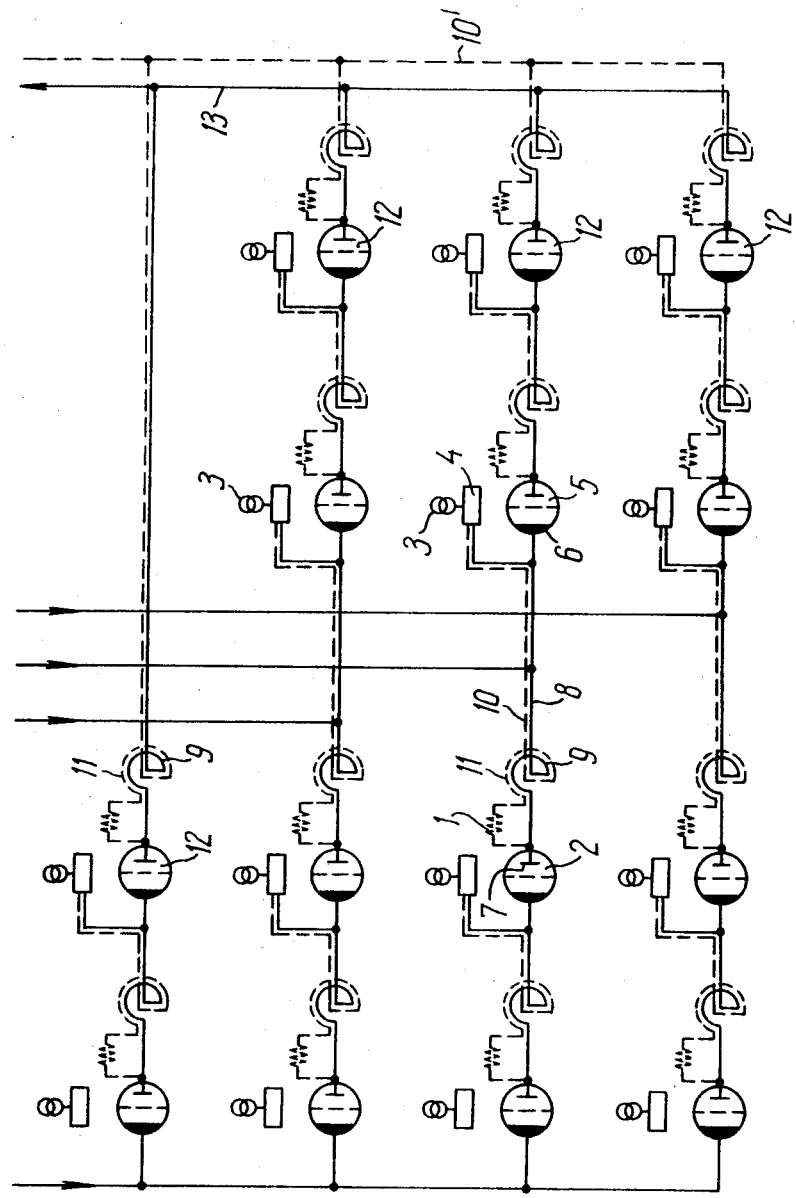

DEVICE FOR ELECTRIC HEATING OF THE ANODES IN HIGH-VOLTAGE MERCURY-ARC RECTIFIERS

The present invention relates to direct-current high-voltage power transmission and, more specifically, to means for electric heating of the anodes in high-voltage mercury-arc rectifiers.

In order to maintain the anode of a mercury-arc rectifier at a temperature which prevents the condensation of mercury vapor on the rectifier anode at the lightest load of the associated bridge converter or when it is the "hot" stand-by, it is important to heat the anode, for which purpose an electric heater is built into it.

In the prior art, there is a means for electric heating of the anode of a mercury-arc rectifier from an individual isolating auxiliary-power transformer of the same rectifier, with the voltage being applied to the electric anode heater over detachable wires when the bridge converter is disconnected and de-energized.

A disadvantage of this prior-art means is the impossibility of heating the anodes when the bridge converter is energized, when it is operating under a minimum load current, or when the bridge converter is in the "hot" stand-by.

It is an object of the present invention to avoid this disadvantage.

The invention aims at providing a means for electric heating of the anodes in high-voltage mercury-arc rectifiers, which is convenient in operation and uses a minimum of ancillary equipment.

With this aim in view, the present invention resides in that in a means for electric heating of the anodes in high-voltage mercury-arc rectifiers used in the bridge converters of d.c. substations according to the invention the electric anode heater of each rectifier is energized from an individual isolating auxiliary-power transformer of an adjacent rectifier in the same phase, the cathode of which is at the potential of the anode being heated.

It is preferable that the rectifiers whose anodes are connected to a bridge-converter terminal should be heated from a single additional common isolating auxiliary-power transformer and that each anode reactor should have an additional isolated winding which connects the electric anode heater to one of the wires of the isolating transformer, while the other wire may be either the power bus connecting the anode of the rectifier being heated to the cathode of an adjacent rectifier, or the power bus connecting the rectifier anode being heated with a bridge-converter terminal, while the wire to the isolating transformer should preferably be laid on one of the said buses.

The means for the electric heating of the anodes in mercury-arc rectifiers disclosed herein does not call for the provision of additional isolating transformers for each rectifier (except one transformer for the rectifiers whose anodes are connected to a bridge-converter terminal). The heaters draw their power from the individual isolating transformers of the mercury-arc rectifiers already provided in the bridge converter. The additional isolating winding in the anode reactor enables power for the electric anode heaters to be applied in such a way that the H.T. buses are used both as conductors of the rectifier anodes and as supports for the insulated return wire.

Thus, the means for anode heating disclosed herein uses a minimum of ancillary equipment, owing to which the surface area of the intermediate-potential platform and the size of the converter building need not be increased, the maintenance cost is reduced, the reliability of the plant is enhanced, and its servicing is simple.

The invention will be more fully understood from the following description of a preferred embodiment when read in connection with the sole FIGURE of the accompanying drawing which shows a means for electric heating of the anodes of mercury-arc rectifiers.

Referring to the illustration, there is a means for electric heating of the anodes of high-voltage mercury-arc rectifiers, in which power for electric anode heaters 1 of mercury-arc rectifiers 2 is taken from an individual isolating transformer 3 via an auxiliary-power cabinet 4 of an adjacent rectifier 5 in the same phase of a bridge converter, the cathode 6 of which is connected to the anode 7 of the rectifier 2 and, as a consequence, is at the same potential.

Connection of the electric heater 1 to the power source, that is the cabinet 4 of the rectifier 5, is by means of the power bus connecting the cathode 6 of the rectifier 5 and its cabinet 4 to the anode 7 of the rectifier 2 via the main winding 9 of the anode reactor.

The return wire is an insulated conductor 10 laid on the said power bus 8 and an additional isolated winding 11 of the anode reactor in the rectifier 2 being heated.

The cabinet 4 incorporates a device for optical ON/OFF control of the electric heater 1 from a level at earth potential. The electric anode heaters 1 of all mercury arc rectifiers 12 whose anodes are connected to a bridge-converter terminal are connected in the heating circuit in the manner described, using a terminal bus 13 of the bridge converter and the main winding of the anode reactor as the "go" wire, while the "return" wire is provided by the insulated conductor 10' laid on the bus 13 and the isolated additional winding 11 of the anode reactor of the rectifiers 12 being heated.

Power for these electric heaters 1 comes from a single common isolating transformer (not shown in the drawing) set up on an intermediate-potential platform and fitted with an optical device for ON/OFF control of the electric heaters from a level at earth potential.

The electric anode heater of each rectifier 2, 5, and 12 is turned ON and OFF by a beam of light incident upon the optical detector located in the cabinet 4 of the rectifiers 5 or 12 and also in the cabinet of the additional isolating transformer furnishing power for the heaters of the rectifiers 12 whose anodes are connected to a bridge-converter terminal. For example, current for the electric heater 1 flows from the busbars of the auxiliary-power transformer 3 located in the cabinet 4, over the bus 8 connecting the anode 7 of the rectifier 2 being heated to the cathode 6 of the rectifier 5, the main winding 9 of the anode reactor of the rectifier 2, and completes its path through the additional isolating winding 11 of the anode reactor and the conductor 10 laid on the bus 8.

The additional winding 11 of the anode reactor enables the return wire 10 to be connected for a lower voltage and laid on the bridge-converter bus 8, which results in a saving of insulation and added convenience in servicing.

What is claimed is:

1. Device for electric heating of the anodes in high-voltage mercury-arc rectifiers, series-connected in the arms of the multiphase bridge converter of d.c. substations, wherein an anode reactor is series-connected with each rectifier, said reactor having an additional isolated winding, while each rectifier is provided with an individual isolating auxiliary-power transformer and a built-in electric anode heater, the latter of the rectifiers whose anodes are connected to a bridge-converter terminal being supplied from a common additional isolating transformer, while the heaters of the remaining rectifiers are supplied each from said individual isolating transformers of an adjacent rectifier in the same phase whose cathode is at the same potential of the anode being heated, the power supply from one phase of each transformer to said heaters being effected by means of a power bus of said converter via the main winding of said reactor, connected to said anode being heated, and the power supply from the other phase of each transformer being effected by means of an insulated wire laid on said power bus via said additional winding of the reactor.

* * * * *